US012621865B2

(12) United States Patent
Mu

(10) Patent No.: US 12,621,865 B2
(45) Date of Patent: May 5, 2026

(54) RANDOM ACCESS PARAMETER PROCESSING METHOD AND APPARATUS, AND STORAGE MEDIUM

(71) Applicant: Beijing Xiaomi Mobile Software Co., Ltd., Beijing (CN)

(72) Inventor: Qin Mu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 556 days.

(21) Appl. No.: 18/005,295

(22) PCT Filed: Jul. 23, 2020

(86) PCT No.: PCT/CN2020/103880
§ 371 (c)(1),
(2) Date: Jan. 12, 2023

(87) PCT Pub. No.: WO2022/016469
PCT Pub. Date: Jan. 27, 2022

(65) Prior Publication Data
US 2023/0262777 A1     Aug. 17, 2023

(51) Int. Cl.
*H04W 74/0833* (2024.01)
(52) U.S. Cl.
CPC ............................... *H04W 74/0833* (2013.01)
(58) Field of Classification Search
None
See application file for complete search history.

(56) References Cited

U.S. PATENT DOCUMENTS

| | | | | |
|---|---|---|---|---|
| 12,160,894 B2 * | 12/2024 | Futaki | ................... | H04W 48/12 |
| 2011/0287776 A1 * | 11/2011 | Vujcic | .............. | H04W 74/0833 |
| | | | | 455/452.1 |
| 2017/0245307 A1 * | 8/2017 | Liu | ..................... | H04L 27/2607 |
| 2022/0287102 A1 * | 9/2022 | Futaki | .............. | H04W 74/0833 |
| 2023/0262777 A1 * | 8/2023 | Mu | ........................ | H04W 74/08 |
| | | | | 370/329 |
| 2025/0048444 A1 * | 2/2025 | Futaki | ................... | H04W 48/12 |

FOREIGN PATENT DOCUMENTS

| | | |
|---|---|---|
| CN | 104488346 A | 4/2015 |
| WO | WO 2018210890 A1 | 11/2018 |

OTHER PUBLICATIONS

First Office Action issued by the State Intellectual Property Office of People's Republic of China on Nov. 25, 2024, in corresponding Application No. CN 202080001701.0, 16 pages.

(Continued)

*Primary Examiner* — Faiyazkhan Ghafoerkhan
(74) *Attorney, Agent, or Firm* — Finnegan, Henderson, Farabow, Garrett & Dunner, L.L.P.

(57) ABSTRACT

A method for processing a random access parameter is performed by a first type user equipment (UE), and includes: determining a first parameter for random access of the first type UE, wherein the first parameter for random access of the first type UE is not completely the same as or completely different from a second parameter for random access of a second type UE, and a type of the first type UE is different from a type of the second type UE.

18 Claims, 4 Drawing Sheets determining a first parameter for random access of the first type UE, in which the first parameter for random access of the first type UE is not completely the same as or completely different from a second parameter for random access of a second type UE; a type of the first type UE is different from a type of the second type UE

S210

(56)          References Cited

OTHER PUBLICATIONS

International Search Report and Written Opinion of International Application No. PCT/CN2020/103880, mailed Mar. 22, 2021, 14 pages.

LG Electronics; Discussion on potential UE complexity reduction features, 3GPP TSG RAN WG1 Meeting #101, R1-2004021, e-meeting, May 25-Jun. 5, 2020, 8 pages.

European Patent Office, Extended European Search Report issued in Application No. 20946028.6 dated Feb. 16, 2024, 13 pages.

Examination report for India Application No. 202347006557, dated Mar. 13, 2024, 7 pages.

Samsung, "RACH procedure considering flexible UE bandwidth," 3GPP TSG RAN WG1 Meeting #87, R1-1612469, Reno, USA, Nov. 14-18, 2016, 3 pages.

CMCC, "Discussion on UE complexity reduction", R1-2003966, 3GPP TSG RAN WG1 #101, e-Meeting, May 25-Jun. 5, 2020, 5 pages.

The Second Office Action for China Application No. 202080001701.0, dated Mar. 31, 2025, 17 pages.

* cited by examiner

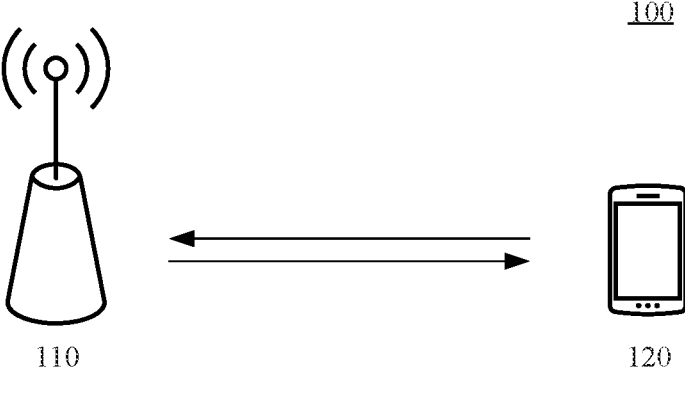

<u>100</u>

110                                    120

FIG. 1 determining a first parameter for random access of the first type UE, in which the first parameter for random access of the first type UE is not completely the same as or completely different from a second parameter for random access of a second type UE; a type of the first type UE is different from a type of the second type UE          S210

FIG. 2 receiving a first parameter sent by a first type UE, in which the first parameter is configured for random access of the first type UE; in which the first parameter for random access of the first type UE is not completely the same as or completely different from a second parameter for random access of a second type UE; a type of the first type UE is different from a type of the second type UE          S310

410 parameter
determining unit

500

510 parameter
receiving unit

RANDOM ACCESS PARAMETER PROCESSING METHOD AND APPARATUS, AND STORAGE MEDIUM

CROSS-REFERENCE TO RELATED APPLICATION

This application is the U.S. national application of International Application No. PCT/CN2020/103880, filed on Jul. 23, 2020, the entire disclosure of which is incorporated herein by reference.

TECHNICAL FIELD

The present disclosure relates to a field of wireless communication technologies, and particularly to a method and an apparatus for processing a random access parameter, and a storage medium.

BACKGROUND

With continuous development and popularization of Internet of Things (IoT) services, such as video surveillance, smart home, wearable devices, industrial sensor monitoring and other services, the services usually need a rate of tens of megabytes to 100M, and also have a relatively high requirement for a delay. Therefore, machine type communication (MTC) and narrow band (NB)-IoT technologies in LTE are difficult to meet requirements. Based on this case, many companies propose a new terminal that is redesigned in 5G new radio (NR) to cover the requirement of such IoT device. In the current 3 GPP standardization, a new radio lite (NR Lite) system introduces a new terminal between a NB terminal and an NR terminal in terms of a transmission delay, a rate requirement and a terminal cost. The new terminal is referred to as a reduced capability user equipment (Redcap UE) or an NR-lite.

In a known technical solution, as long as physical random access channel (PRACH) resources used by terminals for random access have the same time and the same frequency, random access responses (RARs) of the terminals may be in the same physical downlink shared channel (PDSCH), and are scheduled by the same PDCCH (RAR PDCCH). A search space carrying the scheduled random access responses (RARs) in the known NR is referred to as a type-1 PDCCH common search space (CSS), and the cyclic redundancy check (CRC) carried in the PDCCH is scrambled by a random access-radio network temporary identity (RA-RNTI). The current RA-RNTI is determined based on the following rules:

$$RA\text{-}RNTI=1+s\_id+14 \times t\_id+14 \times 80 \times f\_id+14 \times 80 \times 8 \times ul\_carrier\_id,$$

where s_id is a start symbol index of the PRACH, $00 \leq s\_id < 14$; t_id is a start slot index of the PRACH in a system frame, $0 \leq t\_id < 80$; f_id is a frequency domain location index of the PRACH, $0 \leq f\_id < 8$; and ul_carrier_id is an uplink carrier type for sending the MSG1, i.e., a message for sending a preamble sequence (0 represents a normal uplink (NUL) carrier, 1 represents a supplementary uplink (SUL) carrier).

A low-capability terminal and a normal UE (normal terminal) access the network through the same synchronization signal block (SSB), and share a control channel resource set #0 (CORESET #0), and RAR PDCCHs of the low-capability terminal and the normal UE may be sent in the CORESET #0. In this way, there may be two RAR PDCCHs with the same RA-RNTI in the CORESET #0, resulting in a collision.

SUMMARY

According to a first aspect of the present disclosure, a method for processing a random access parameter is performed by a first type user equipment (UE). The method includes:

determining a first parameter for random access of the first type UE, in which the first parameter for random access of the first type UE is not completely the same as or completely different from a second parameter for random access of a second type UE, and a type of the first type UE is different from a type of the second type UE.

According to a second aspect of the present disclosure, a method for processing a random access parameter is performed by a network device. The method includes:

receiving a first parameter sent by a first type user equipment (UE), in which the first parameter is configured for random access of the first type UE; in which the first parameter for random access of the first type UE is not completely the same as or completely different from a second parameter for random access of a second type UE, and a type of the first type UE is different from a type of the second type UE.

According to a third aspect of the present disclosure, a first type user equipment (UE) includes:

a processor; and a memory configured to store instructions executable by the processor:

in which, the processor is configured to: determine a first parameter for random access of the first type UE. The first parameter for random access of the first type UE is not completely the same as or completely different from a second parameter for random access of a second type UE, and a type of the first type UE is different from a type of the second type UE.

It should be noted that, the details above and in the following are exemplary and illustrative, and do not constitute the limitation on the present disclosure.

BRIEF DESCRIPTION OF THE DRAWINGS

The drawings herein are incorporated into the specification and constitute a part of the specification, show embodiments in conformity with embodiments of the present disclosure, and explain the principle of the present disclosure together with the specification.

FIG. 1 is a diagram illustrating a wireless communication system according to an example embodiment.

FIG. 2 is a flowchart illustrating a method for processing a random access parameter according to an example embodiment.

FIG. 3 is a flowchart illustrating a method for processing a random access parameter according to an example embodiment.

DETAILED DESCRIPTION

Figure 4:
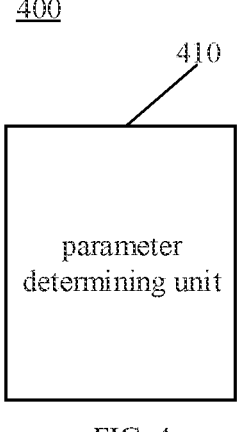
FIG. 4 is a block diagram illustrating an apparatus for processing a random access parameter according to an example embodiment.

The example embodiments will be described in detail here, and examples thereof are shown in the accompanying drawings. When the following descriptions refer to the accompanying drawings, unless otherwise indicated, the same numbers in different drawings represent the same or similar elements. The implementations described in the following exemplary embodiments do not represent all implementations consistent with the present disclosure. Rather, they are merely examples of apparatuses and methods consistent with some aspects of the disclosure as detailed in the appended claims.

The access method according to the embodiments of the present disclosure may be applied to a wireless communication system as illustrated in FIG. 1. As illustrated in FIG. 1, the wireless communication system 100 includes a network device 110 and a terminal 120. The network device 110 and the terminal 120 send and receive information through wireless resources.

It may be understood that, the wireless communication system as illustrated in FIG. 1 is only exemplary, and the wireless communication system may further include other network devices, for example, may further include a core network device, a wireless relay device and a wireless backhaul device not shown in FIG. 1. The number of network devices and the number of terminals included in the wireless communication system are not limited in embodiments of the present disclosure.

It may be further understood that, the wireless communication system in the embodiments of the present disclosure is a network that provides a wireless communication function. The wireless communication system may adopt different communication technologies, for example, code division multiple access (CDMA), wideband code division multiple access (WCDMA), time division multiple access (TDMA), frequency division multiple access (FDMA), orthogonal frequency-division multiple access (OFDMA), single Carrier FDMA (SC-FDMA) and carrier sense multiple access with collision avoidance (CSMA/CA). The network may be divided into a 2G (generation) network, a 3G network, a 4G network, or a future evolved network based on capacities, rates, latencies and other factors of different networks, for example, a 5G network (which may also be referred to as 5G NR). For ease of description, a wireless communication network is simply referred to as a network in the disclosure sometimes.

Further, the network device involved in the present disclosure may also be referred to as a wireless access network device. The wireless access network device may be a base station, an evolved NodeB (eNodeB or eNB), a home base station, an access point (AP) in a wireless fidelity (WiFi) system, a wireless relay node, a wireless backhaul node, a transmission point (TP), or a transmission and reception point (TRP), etc., or a base station (gNodeB or gNB) in an NR system, or may further be a component or a part of a device constituting a base station. It should be understood that, a specific technology and a specific device form adopted by the network device are not limited in the embodiments of the present disclosure. In the present disclosure, the network device may provide communication coverage for a specific geographic area, and may communicate with a terminal located within the coverage area (cell). In addition, the network device further may be a vehicle-mounted device in an Internet of Vehicles (V2X) communication system.

Further, the terminal involved in the present disclosure may also be referred to as a terminal device, a user equipment (UE), a mobile station (MS), a mobile terminal (MT) etc., which is a device that provides voice and/or data connectivity to a user. For example, the terminal may be a handheld device or a vehicle-mounted device with a wireless connection function, etc. At present, an example of some terminals includes, for example, a mobile phone (a pocket personal computer (PPC), a palm computer, a personal digital assistant (PDA), a notebook computer, a tablet computer, a wearable device, or a vehicle-mounted device. In addition, the terminal device further may be a vehicle-mounted/on-board device in the V2X communication system. It should be understood that, a specific technology and a specific device form adopted by the terminal are not limited in the embodiments of the present disclosure.

The terminal described in the embodiments of the present disclosure may be understood as a new terminal type designed in 5G NR: a reduced capability UE or NR-lite. In the embodiments of the present disclosure, the new terminal is referred to as 5G NR-lite.

Similar to an Internet of Things (IoT) device in Long Term Evolution (LTE), the 5G NR-lite usually needs to meet the following requirements: low cost, low complexity, coverage enhancement to a certain degree, and power saving.

Since the current NR system is designed for a high-end terminal with a high speed and a low delay, the current design may not meet the above requirements of NR-Lite. The current NR system needs to be improved to meet the requirements of NR-Lite. For example, in order to meet the requirements such as low cost and low complexity, a radio frequency (RF) bandwidth of an NR-IoT may be limited, for example, to 5 MHz or 10 MHz, or a size of a buffer of the NR-Lite is limited, and a size of a transmission block received each time is thus limited, etc. For power saving, a possible optimization direction is to simplify a communication process, reduce a number of times for which the NR-Lite terminal detects a downlink control channel, etc.

Since the receiving capability of a low-capability terminal is different from the receiving capability of a normal NR terminal, the network may configure different initial uplink (UL) bandwidth parts (BWPs) for the low-capability terminal and the normal terminal. There are various corresponding PRACH configurations on the different initial UL BWPs.

Since an RA-RNTI is only related to a time frequency serial number of a PRACH in each BWP, the low-capability terminal and the normal terminal access the network through the same SSB and share a CORESET #0 at this time, RAR PDCCHs of both terminals may be sent in the CORESET #0. When the low-capability terminal and the normal terminal send by using the same RACH Occasion (RO) and using PRACH frequency resources of the same serial number in their respective initial UL BWPs, there may be two RAR PDCCHs with the same RA-RNTI in the CORESET #0, resulting in a collision.

A method for processing a random access parameter is provided in embodiments of the present disclosure, which is applied to a first type user equipment (UE). FIG. 2 is a flowchart illustrating a method for processing a random access parameter according to an example embodiment. As illustrated in FIG. 2, the method for processing the random access parameter is applied to the first type UE, and includes the following step at S210.

At S210, a first parameter for random access of the first type UE is determined. The first parameter for random access of the first type UE is not completely the same as or completely different from a parameter for random access of a second type UE; and a type of the first type UE is different from a type of the second type UE.

Based on the step at S210, the first type UE determines its corresponding RA-RNTI, the first parameter corresponds to the RA-RNTI of the first type UE, and the second parameter corresponds to an RA-RNTI of the second type UE. For example, the first type UE is a Redcap UE, and the second type UE is a normal NR UE.

In some embodiments of the present disclosure, a UE capability of the first type UE is lower than a UE capability of the second type UE. As described above, in the NR lite system, the first type UE may be a Redcap UE, and the second type UE may be a normal NR UE. The first type UE and the second type UE may be UEs with different capabilities. It should be understood that, in the embodiments of the present disclosure, specific types of the first type UE and the second type UE are not limited. Various example embodiments of the present disclosure are described below by taking the first type UE being a Redcap UE and the second type UE being a normal NR UE as an example.

In some embodiments of the present disclosure, the first parameter for random access of the first type UE is configured to enable the network device to determine an initial UL BWP corresponding to the first type UE. The initial UL BWP corresponding to the first type UE is different from an initial UL BWP corresponding to the second type UE.

In some embodiments of the present disclosure, the first type UE determines the corresponding RA-RNTI based on the parameter of the second type UE. For example, determining the first parameter for random access of the first type UE, includes the following (1) or (2) or (3) or (4):

(1) The first parameter for random access of the first type UE is determined based on a frequency division multiplexing (FDM) parameter corresponding to the second type UE.

In some embodiments of the present disclosure, when a supplementary uplink (SUL) is not configured, the RA-RNTI corresponding to the first type UE is determined only based on Z (i.e., the FDM parameter). Specifically, when the SUL is not configured, the method for determining the RA-RNTI includes: determining the RA-RNTI of the Redcap UE through an equation RA-RNTI=1+s_id+14×t_id+14×80×f_id+14×80×Z.

where s_id is a start symbol index of the PRACH, $00 \le s\_id < 14$;

t_id is a start slot index of the PRACH in a system frame, $0 \le t\_id < 80$;

f_id is a frequency domain location index of the PRACH, $0 \le f\_id < 8$; and

Z is a number of FDMs of the normal UE at each RO.

(2) The first parameter for random access of the first type UE is determined based on the FDM parameter corresponding to the second type UE and the SUL parameter corresponding to the first type UE.

In some embodiments of the present disclosure, the RA-RNTI corresponding to the first type UE is determined based on the SUL corresponding to the first type UE and the Z corresponding to the second type UE.

(3) The first parameter for random access of the first type UE is determined based on the FDM parameter corresponding to the second type UE and the SUL parameter corresponding to the second type UE.

In some embodiments of the present disclosure, the RA-RNTI corresponding to the first type UE is determined based on the SUL and the Z. Specifically, the method for determining the RA-RNTI includes: determining the RA-RNTI of the Redcap UE through an equation RA-RNTI=1+s_id+14×t_id+14×80×f_id+14×80×Z+14×80×8, where s_id is a start symbol index of the PRACH, $00 \le s\_id < 14$:

t_id is a start slot index of the PRACH in a system frame, $0 \le t\_id < 80$;

f_id is a frequency domain location index of the PRACH, $0 \le f\_id < 8$; and

Z is a number of FDMs of the normal UE at each RO.

(4) The first parameter for random access of the first type UE is determined based on the FDM parameter corresponding to the second type UE, the SUL parameter corresponding to the second type UE and the SUL parameter corresponding to the first type UE.

In some embodiments of the present disclosure, the RA-RNTI of the Redcap UE is determined based on the SUL and the Z corresponding to the normal UE, and the SUL corresponding to the Redcap UE. Specifically, the method for determining the RA-RNTI includes: determining the RA-RNTI of the Redcap UE through an equation RA-RNTI=1+s_id+14×t_id+14×80×f_id+14×80×Z+14×80×8×UL_id+14×80×UL_id_RedCap, where s_id is a start symbol index of the PRACH, $00 \le s\_id < 14$:

t_id is a start slot index of the PRACH in a system frame, $0 \le t\_id < 80$;

f_id is a frequency domain location index of the PRACH, $0 \le f\_id < 8$; and

Z is a number of FDMs of the normal UE at each RO:

UL_id=0 or 1, in which UL_id=0 represents that the normal UE is not configured with the SUL, and UL_id=1 represents that the normal UE is configured with the SUL; and UL_id_RedCap=0 or 1, in which UL_id_RedCap=0 represents the PRACH sent by the RedCap UE on a normal UL, and UL_id_RedCap=1 represents the PRACH sent by the RedCap UE on the SUL available for the RedCap UE.

In some embodiments of the present disclosure, the method includes the following (1) or (2) or (3):

(1) The FDM parameter corresponding to the second type UE is determined based on remaining minimum system information (RMSI) of the second type UE. For example, the FDM parameter Z in the above equation is determined by the RMSI of the normal UE.

(2) The FDM parameter corresponding to the second type UE is determined based on a communication protocol. For example, the FDM parameter Z in the above equation is determined by the communication protocol or is preconfigured.

(3) The FDM parameter corresponding to the second type UE is determined based on a received signaling. The signaling at least includes a field domain or an identifier for indicating the FDM parameter corresponding to the second type UE. For example, the FDM parameter Z in the above equation is determined by the signaling.

In some embodiments of the present disclosure, the method includes: determining the FDM parameter corresponding to the second type UE based on a pre-configuration parameter. The FDM parameter Z in the above equation is determined by the communication protocol or is preconfigured.

In some embodiments of the present disclosure, the RA-RNTI of the Redcap UE is determined based on an offset parameter configured on a network side. Specifically, determining the first parameter for random access of the first type UE, includes the following (1) or (2) or (3):

(1) An offset parameter is determined, and the first parameter for random access of the first type UE is determined based on the offset parameter. For example, the offset parameter is only limited, and the first parameter for random access of the first type UE is determined based on the offset parameter.

(2) The offset parameter is determined, and the first parameter for random access of the first type UE is determined based on the offset parameter and a preset parameter. For example, the first parameter for random access of the first type UE is determined based on the offset parameter and the preset parameter which is set to 8.

(3) The offset parameter is determined, and the first parameter for random access of the first type UE is determined based on the offset parameter and the FDM parameter corresponding to the second type UE. For example, a value of the FDM parameter Z may be dynamically configured based on the above method.

In some embodiments of the present disclosure, the way for determining the FDM parameter is further limited in the method. In particular, the method includes the following (1) or (2) or (3) or (4):

(1) The FDM parameter corresponding to the second type UE is determined based on the RMSI of the second type UE.

(2) The FDM parameter corresponding to the second type UE is determined based on the communication protocol.

(3) The FDM parameter corresponding to the second type UE is determined based on the pre-configuration parameter.

(4) The FDM parameter corresponding to the second type UE is determined based on the received signaling. The signaling at least includes the field domain or the identifier for indicating the FDM parameter corresponding to the second type UE.

In some embodiments of the present disclosure, the above preset parameter may be limited in the following ways. Specifically, the method includes the following (1) or (2) or (3):

(1) the preset parameter is determined based on the communication protocol;

(2) the preset parameter is determined based on the pre-configuration parameter:

(3) the preset parameter is determined based on the received signaling, in which the signaling at least includes the field domain or the identifier for indicating the preset parameter.

In some embodiments of the present disclosure, the offset parameter is specified based on the communication protocol, and the UE determines a specific offset value based on the state. Specifically, the method includes the following (1) or (2) or (3):

(1) The offset parameter is determined based on the communication protocol.

(2) A candidate offset parameter set is determined based on the communication protocol; and at least one candidate offset parameter is determined as the offset parameter from the candidate offset parameter set based on the received signaling, in which the signaling at least includes the field domain or the identifier for indicating the offset parameter. For example, candidate offset parameters are given in the communication protocol, and one of the candidate offset parameters configured at a local side is taken as an offset parameter.

(3) The offset parameter is determined based on the received signaling; the signaling at least includes the field domain or the identifier for indicating the preset parameter. For example, a value of the offset parameter is directly configured at the local side.

In some embodiments of the present disclosure, the method for determining the RA-RNTI includes: determining the RA-RNTI of the Redcap UE through an equation RA-RNTI=1+s_id+14×t_id+14×80×f_id+14×80×8×a, where s_id is a start symbol index of the PRACH, $0 \le s\_id < 14$;

t_id is a start slot index of the PRACH in a system frame, $0 \le t\_id < 80$:

f_id is a frequency domain location index of the PRACH, $0 \le f\_id < 8$; and a is an offset value configured by the network, for example, a=1, 2, 3 or 4.

In some embodiments of the present disclosure, the method includes: sending the first parameter.

In some embodiments of the present disclosure, the method includes: receiving a PDCCH corresponding to a random access response (RAR), in which the PDCCH corresponding to RAR is identified based on the first parameter.

The technical solution provided in embodiments of the present disclosure may include the following beneficial effects: by configuring the first parameter for random access of the first type UE, the situation may be avoided that a collision occurs when the first type UE and the second type UE send by using the same RACH Occasion (RO) and using PRACH frequency resources of the same serial number in their respective initial UL BWPs.

It needs to be noted that, those skilled in the art may understand that various implementations/embodiments involved in embodiments of the present disclosure may be used in combination with the above embodiments, and may be independently used. Whether independently used or used in combination with the above embodiments, the implementation principle is similar. In the embodiments of the present disclosure, part of embodiments are illustrated by the implementations used together: it may be understood by those skilled in the art that the examples are not a limitation of embodiments of the present disclosure.

A method for processing a random access parameter is provided in embodiments of the present disclosure, which is applied to a network device. FIG. 3 is a flowchart illustrating a method for processing a random access parameter according to an example embodiment. As illustrated in FIG. 3, the method for processing the random access parameter is applied to the network device, and includes the following step at S310.

At S310, the first parameter sent by the first type UE is received, in which the first parameter is configured for random access of the first type UE; the first parameter for random access of the first type UE is not completely the same as or completely different from the parameter for random access of the second type UE: the type of the first type UE is different from the type of the second type UE.

In some embodiments of the present disclosure, the UE capability of the first type UE is lower than the UE capability of the second type UE.

In some embodiments of the present disclosure, the first parameter for random access of the first type UE is configured to enable the network device to determine the initial UL BWP corresponding to the first type UE. The initial UL BWP corresponding to the first type UE is different from the initial UL BWP corresponding to the second type UE.

In some embodiments of the present disclosure, the first parameter for random access of the first type UE, is determined based on at least one of:

determining the first parameter for random access of the first type UE based on an FDM parameter corresponding to the second type UE;

or determining the first parameter for random access of the first type UE based on an FDM parameter corresponding to the first type UE and a SUL parameter corresponding to the first type UE;

or determining the first parameter for random access of the first type UE based on an FDM parameter corresponding to the second type UE and a SUL parameter corresponding to the first type UE;

or determining the first parameter for random access of the first type UE based on an FDM parameter corresponding to the second type UE and a SUL parameter corresponding to the second type UE;

or determining the first parameter for random access of the first type UE based on an FDM parameter corresponding to the second type UE, a SUL parameter corresponding to the second type UE and a SUL parameter corresponding to the first type UE.

In some embodiments of the present disclosure, the FDM parameter corresponding to the second type UE, is determined based on at least one of:

determining the FDM parameter corresponding to the second type UE based on the RMSI of the second type UE:

or determining the FDM parameter corresponding to the second type UE based on the communication protocol;

or determining the FDM parameter corresponding to the second type UE based on the received signaling, in which the signaling at least includes the field domain or the identifier for indicating the FDM parameter corresponding to the second type UE.

In some embodiments of the present disclosure, the FDM parameter corresponding to the second type UE, is determined based on:

determining the FDM parameter corresponding to the second type UE based on the pre-configuration parameter.

In some embodiments of the present disclosure, the first parameter for random access of the first type UE, is determined based on at least one of:

determining an offset parameter, and determining the first parameter for random access of the first type UE based on the offset parameter:

or determining an offset parameter, and determining the first parameter for random access of the first type UE based on the offset parameter and the preset parameter.

or determining an offset parameter, and determining the first parameter for random access of the first type UE based on the offset parameter and the FDM parameter corresponding to the second type UE.

In some embodiments of the present disclosure, the FDM parameter corresponding to the second type UE, is determined based on at least one of:

determining the FDM parameter corresponding to the second type UE based on the RMSI of the second type UE;

or determining the FDM parameter corresponding to the second type UE based on the communication protocol;

or determining the FDM parameter corresponding to the second type UE based on the pre-configuration parameter;

or determining the FDM parameter corresponding to the second type UE based on the received signaling, in which the signaling at least includes the field domain or the identifier for indicating the FDM parameter corresponding to the second type UE.

In some embodiments of the present disclosure, the preset parameter is determined based on at least one of:

determining the preset parameter based on the communication protocol:

or determining the preset parameter based on the pre-configuration parameter:

or determining the preset parameter based on the received signaling; the signaling at least includes the field domain or the identifier for indicating the preset parameter.

In some embodiments of the present disclosure, the offset parameter is determined based on at least one of:

determining the offset parameter based on the communication protocol;

or determining the candidate offset parameter set based on the communication protocol: and determining at least one candidate offset parameter from the candidate offset parameter set based on the received signaling as the offset parameter, in which the signaling at least includes the field domain or the identifier for indicating the offset parameter;

or determining the offset parameter based on the received signaling, in which the signaling at least includes the field domain or the identifier for indicating the preset parameter.

In some embodiments of the present disclosure, the method includes: sending the PDCCH corresponding to the random access response (RAR), in which the PDCCH corresponding to the RAR is identified based on the first parameter.

It needs to be noted that, those skilled in the art may understand that various implementations/embodiments involved in embodiments of the present disclosure may be used in combination with the above embodiments, and may be independently used. Whether independently used or used in combination with the above embodiments, the implementation principle is similar. In the embodiments of the present disclosure, part of embodiments are illustrated by the implementations used together: it may be understood by those skilled in the art that the examples are not a limitation of embodiments of the present disclosure.

The apparatus embodiments of the present disclosure are described below, which may be configured to implement the method embodiments of the present disclosure. For details not disclosed in the apparatus embodiments of the present disclosure, please refer to the method embodiments of the present disclosure.

Based on the same conception, an apparatus for processing a random access parameter is provided in embodiments of the present disclosure, which is applied to the first type UE.

FIG. 4 is a block diagram illustrating an apparatus for processing a random access parameter according to an example embodiment. As illustrated in FIG. 4, an apparatus 400 for processing a random access parameter is applied to a first type user equipment (UE), and includes a parameter determining unit 410.

The parameter determining unit 410 is configured to determine a first parameter for random access of the first type UE. The first parameter for random access of the first type UE is not completely the same as or completely different from the second parameter for random access of the second type UE. The type of the first type UE is different from the type of the second type UE.

In some embodiments of the present disclosure, the UE capability of the first type UE is lower than the UE capability of the second type UE.

In some embodiments of the present disclosure, the first parameter for random access of the first type UE is configured to enable the network device to determine the initial UL BWP corresponding to the first type UE. The initial UL BWP corresponding to the first type UE is different from the initial UL BWP corresponding to the second type UE.

In some embodiments of the present disclosure, determining the first parameter for random access of the first type UE, includes:

determining the first parameter for random access of the first type UE based on an FDM parameter corresponding to the second type UE;
or
determining the first parameter for random access of the first type UE based on an FDM parameter corresponding to the first type UE and a SUL parameter corresponding to the first type UE;
or
determining the first parameter for random access of the first type UE based on an FDM parameter corresponding to the second type UE and a SUL parameter corresponding to the first type UE;
or
determining the first parameter for random access of the first type UE based on an FDM parameter corresponding to the second type UE and a SUL parameter corresponding to the second type UE;
or
determining the first parameter for random access of the first type UE based on an FDM parameter corresponding to the second type UE, a SUL parameter corresponding to the second type UE and a SUL parameter corresponding to the first type UE.

In some embodiments of the present disclosure, the method includes:

determining the FDM parameter corresponding to the second type UE based on the RMSI of the second type UE:
or
determining the FDM parameter corresponding to the second type UE based on the communication protocol;
or
determining the FDM parameter corresponding to the second type UE based on the received signaling, in which the signaling at least includes the field domain or the identifier for indicating the FDM parameter corresponding to the second type UE.

In some embodiments of the present disclosure, the method includes:

determining the FDM parameter corresponding to the second type UE based on the pre-configuration parameter.

In some embodiments of the present disclosure, determining the first parameter for random access of the first type UE, includes:

determining an offset parameter, and determining the first parameter for random access of the first type UE based on the offset parameter:
or
determining an offset parameter, and determining the first parameter for random access of the first type UE based on the offset parameter and the preset parameter.
or
determining an offset parameter, and determining the first parameter for random access of the first type UE based on the offset parameter and the FDM parameter corresponding to the second type UE.

In some embodiments of the present disclosure, the method includes:

determining the FDM parameter corresponding to the second type UE based on the RMSI of the second type UE;
or
determining the FDM parameter corresponding to the second type UE based on the communication protocol:
or
determining the FDM parameter corresponding to the second type UE based on the pre-configuration parameter:
or
determining the FDM parameter corresponding to the second type UE based on the received signaling, in which the signaling at least includes the field domain or the identifier for indicating the FDM parameter corresponding to the second type UE.

In some embodiments of the present disclosure, the method includes:

determining the preset parameter based on the communication protocol;
or
determining the preset parameter based on the pre-configuration parameter;
or
determining the preset parameter based on the received signaling, in which the signaling at least includes the field domain or the identifier for indicating the preset parameter.

In some embodiments of the present disclosure, the method includes:

determining the offset parameter based on the communication protocol;
or
determining the candidate offset parameter set based on the communication protocol, and determining at least one candidate offset parameter from the candidate offset parameter set based on the received signaling as the offset parameter, in which the signaling at least includes the field domain or the identifier for indicating the offset parameter;
or
determining the offset parameter based on the received signaling, in which the signaling at least includes the field domain or the identifier for indicating the preset parameter.

In some embodiments of the present disclosure, the method includes: sending the first parameter.

In some embodiments of the present disclosure, the method includes: receiving the PDCCH corresponding to the RAR, in which the RAR is identified based on the first parameter.

The apparatus embodiments of the present disclosure are described below, which may be configured to implement the method embodiments of the present disclosure. For details not disclosed in the apparatus embodiments of the present disclosure, please refer to the method embodiments of the present disclosure.

Based on the same conception, an apparatus for processing a random access parameter is provided in embodiments of the present disclosure, which is applied to the network device.

Figure 5:
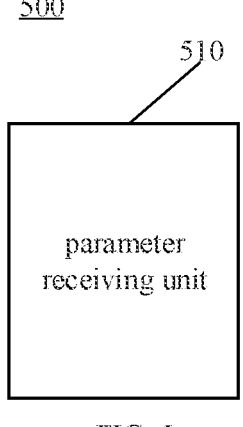
FIG. 5 is a block diagram illustrating an apparatus for processing a random access parameter according to an example embodiment.

FIG. 5 is a block diagram illustrating an apparatus for processing a random access parameter according to an example embodiment. As illustrated in FIG. 5, the apparatus 500 for processing the random access parameter is applied to the network device, and includes a parameter receiving unit 510.

The parameter receiving unit 510 is configured to receive the first parameter sent by the first type UE, in which the first parameter is configured for random access of the first type UE: the first parameter for random access of the first type UE is not completely the same as or completely different from the parameter for random access of the second type UE; the type of the first type UE is different from the type of the second type UE.

In some embodiments of the present disclosure, the UE capability of the first type UE is lower than the UE capability of the second type UE.

In some embodiments of the present disclosure, the first parameter for random access of the first type UE is configured to enable the network device to determine the initial UL BWP corresponding to the first type UE. The initial UL BWP corresponding to the first type UE is different from the initial UL BWP corresponding to the second type UE.

In some embodiments of the present disclosure, the first parameter for random access of the first type UE, is determined based on at least one of:

determining the first parameter for random access of the first type UE based on an FDM parameter corresponding to the second type UE;

or determining the first parameter for random access of the first type UE based on an FDM parameter corresponding to the first type UE and a SUL parameter corresponding to the first type UE;

or determining the first parameter for random access of the first type UE based on an FDM parameter corresponding to the second type UE and a SUL parameter corresponding to the first type UE;

or determining the first parameter for random access of the first type UE based on an FDM parameter corresponding to the second type UE and a SUL parameter corresponding to the second type UE:

or determining the first parameter for random access of the first type UE based on an FDM parameter corresponding to the second type UE, a SUL parameter corresponding to the second type UE and a SUL parameter corresponding to the first type UE.

In some embodiments of the present disclosure, the FDM parameter corresponding to the second type UE, is determined based on at least one of:

determining the FDM parameter corresponding to the second type UE based on the RMSI of the second type UE:

or determining the FDM parameter corresponding to the second type UE based on the communication protocol;

or determining the FDM parameter corresponding to the second type UE based on the received signaling, in which the signaling at least includes the field domain or the identifier for indicating the FDM parameter corresponding to the second type UE.

In some embodiments of the present disclosure, the FDM parameter corresponding to the second type UE, is determined based on:

determining the FDM parameter corresponding to the second type UE based on the pre-configuration parameter.

In some embodiments of the present disclosure, the first parameter for random access of the first type UE, is determined based on at least one of:

determining an offset parameter, and determining the first parameter for random access of the first type UE based on the offset parameter;

or determining an offset parameter, and determining the first parameter for random access of the first type UE based on the offset parameter and the preset parameter.

or determining an offset parameter, and determining the first parameter for random access of the first type UE based on the offset parameter and an FDM parameter corresponding to the second type UE.

In some embodiments of the present disclosure, the FDM parameter corresponding to the second type UE, is determined based on at least one of:

determining the FDM parameter corresponding to the second type UE based on the RMSI of the second type UE:

or determining the FDM parameter corresponding to the second type UE based on the communication protocol;

or determining the FDM parameter corresponding to the second type UE based on the pre-configuration parameter;

or determining the FDM parameter corresponding to the second type UE based on the received signaling, in which the signaling at least includes the field domain or the identifier for indicating the FDM parameter corresponding to the second type UE.

In some embodiments of the present disclosure, the preset parameter is determined based on at least one of:

determining the preset parameter based on the communication protocol:

or determining the preset parameter based on the pre-configuration parameter;

or determining the preset parameter based on the received signaling, in which the signaling at least includes the field domain or the identifier for indicating the preset parameter.

In some embodiments of the present disclosure, the offset parameter is determined based on at least one of:

determining the offset parameter based on the communication protocol;

or determining the candidate offset parameter set based on the communication protocol; and determining at least one candidate offset parameter from the candidate offset parameter set based on the received signaling as the offset parameter, in which the signaling at least includes the field domain or the identifier for indicating the offset parameter;

or determining the offset parameter based on the received signaling, in which the signaling at least includes the field domain or the identifier for indicating the preset parameter.

In some embodiments of the present disclosure, the method includes: sending the PDCCH corresponding to the RAR, in which the PDCCH corresponding to the RAR is identified based on the first parameter.

It may be understood that, the apparatus for processing the random access parameter according to the embodiments of the present disclosure includes hardware structures and/or software modules that perform corresponding functions in order to achieve the above functions. In combination with modules and algorithm steps of examples described in embodiments of the present disclosure, the embodiments of the present disclosure may be implemented in the form of a hardware or a combination of a hardware and a computer software. Whether a certain function is executed by a hardware or a computer software driving a hardware depends on specific applications and design constraints of the technical solution. Those skilled in the art may adopt different methods for each specific application to implement the described functions, but such implementation should not be considered as going beyond the scope of the technical solutions in embodiments of the present disclosure.

Figure 6:
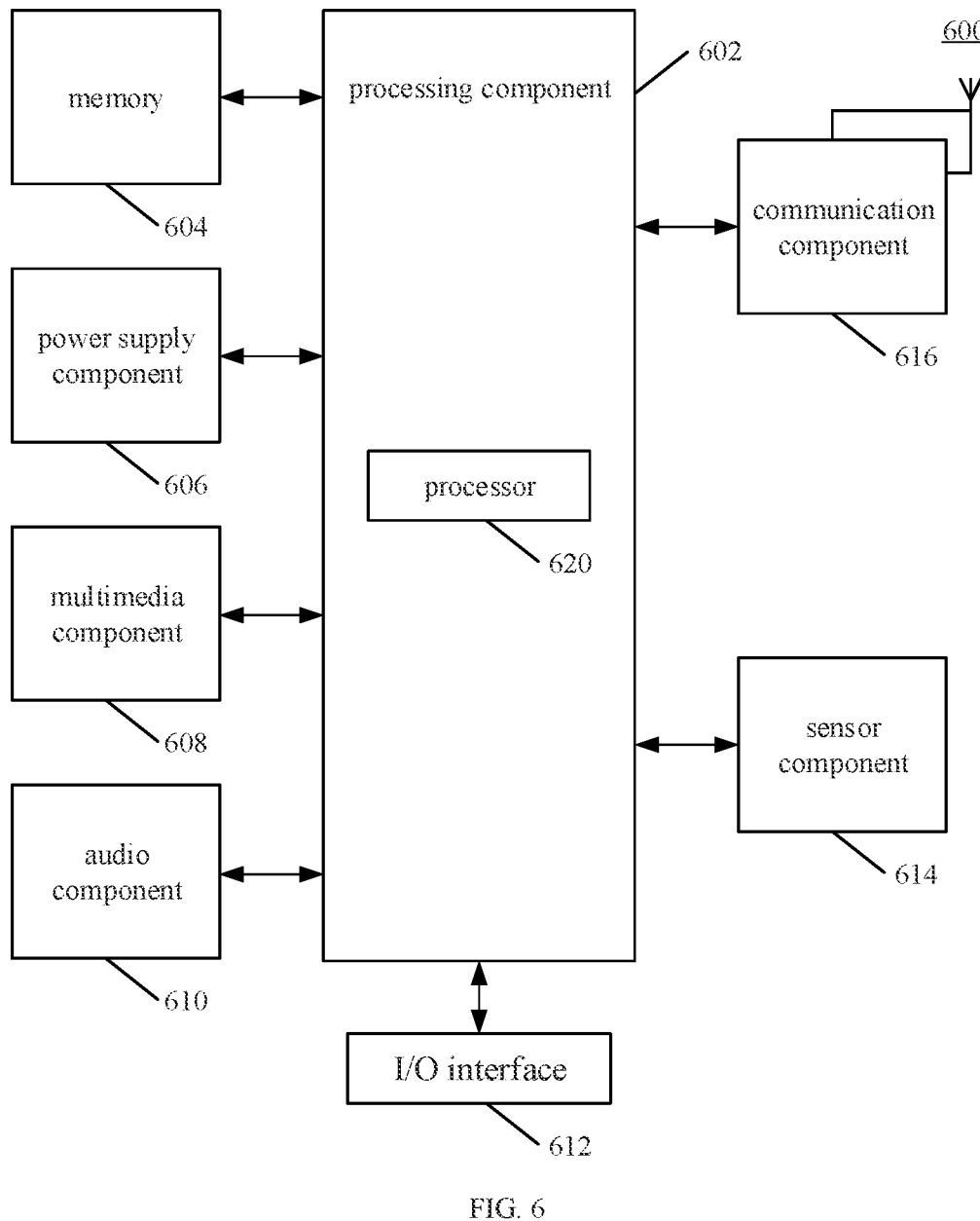
FIG. 6 is a block diagram illustrating a device for processing a random access parameter according to an example embodiment.

FIG. 6 is a block diagram illustrating a device 600 for processing a random access parameter according to an example embodiment. For example, the device 600 may be a terminal. The terminal may be a mobile phone, a computer, a digital broadcasting terminal, a messaging device, a game console, a tablet device, a medical device, a fitness equipment, a personal digital assistant, etc.

As illustrated in FIG. 6, the device 600 may include one or more components: a processing component 602, a memory 604, a power supply component 606, a multimedia component 608, an audio component 610, an input/output (I/O) interface 612, a sensor component 614, and a communication component 616.

The processing component 602 generally controls the whole operation of the device 600, such as the operations related to display, phone call, data communication, camera operations and recording operations. The processing component 602 may include one or more processors 620 to perform instructions, to complete all or part of steps of the above method. In addition, the processing component 602 may include one or more modules for the convenience of interaction between the processing component 602 and other components. For example, the processing component 602 may include a multimedia module for the convenience of interaction between the multimedia component 608 and the processing component 602.

The memory 604 is configured to store all types of data to support the operation of the device 600. Examples of the data include the instructions of any applications or methods operated on the device 600, contact data, phone book data, messages, pictures, videos, etc. The memory 604 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 606 may provide power supply for all components of the device 600. The power supply component 606 may include power supply management system, one or more power supplies, and other units related to generating, managing and distributing power for the device 600.

The multimedia component 608 includes an output interface screen provided between the device 600 and the user. In some embodiments, a screen may include a liquid crystal display (LCD) and a touch panel (TP). When the screen includes a touch panel, the screen may be implemented as a touch screen to receive input signals from the user. The touch panel includes one or more touch sensors to sense touch, slide and gestures on the touch panel. The touch sensor may not only sense the boundary of touch or slide actions, but also detect the duration and pressure related to the touch or slide actions. In some embodiments, the multimedia component 608 includes a front camera and/or a rear camera. When the device 600 is in an operation mode, such as a shooting mode or a video mode, the front camera or the rear camera may receive external multimedia data. Each front camera and rear camera may be a fixed optical lens system or an optical lens system with a focal length and an optical zoom capacity.

The audio component 610 is configured as output and/or input signal. For example, the audio component 610 includes a microphone (MIC). When the device 600 is in an operation mode, such as a call mode, a record mode, and a speech recognition mode, the microphone is configured to receive external audio signals. The audio signals received may be further stored in the memory 604 or sent via the communication component 616. In some embodiments, the audio component 610 further includes a speaker configured to output an audio signal.

The I/O interface 612 provides an interface for the processing component 602 and the peripheral interface module, and the peripheral interface module may be a keyboard, a click wheel, a button, etc. The buttons may include but not limited to a home button, a volume button, a start button and a lock button.

The sensor component 614 includes one or more sensors, configured to provide various aspects of state assessment for the device 600. For example, the sensor component 614 may detect the on/off state of the device 600 and the relative positioning of the component. For example, the component is a display and a keypad of the device 600. The sensor component 614 may further detect the location change of the device 600 or one component of the device 600, the presence or absence of contacts between the user and the device 600, the orientation or acceleration/deceleration of the device 600, and the temperature change of the device 600. The sensor component 614 may include a proximity sensor, which is configured to detect the existence of the objects nearby without any physical contacts. The sensor component 614 may further include a light sensor such as CMOS or CCD image sensor, which is configured to use in imaging applications. In some embodiments, the sensor component 614 may further include an acceleration transducer, a gyroscope sensor, a magnetic sensor, a pressure sensor or a temperature sensor.

The communication component 616 is configured for the convenience of wire or wireless communication between the device 600 and other devices. The device 600 may access wireless networks based on communication standards, such as WiFi, 2G or 3G. or their combination. In an example embodiment, the communication component 616 receives broadcast signals or broadcast-related information from an external broadcast management system via a broadcast channel. In an exemplary embodiment, the communication units 616 further includes a near field communication (NFC) module to facilitate short-range communication. For example, an NFC module may be implemented based on radio frequency identification (RFID) technology, infrared data association (IRDA) technology, ultra-wideband (UWB) technology, bluetooth (BT) technology and other technologies.

In an example embodiment, the device 600 may be implemented by one or more application specific integrated circuits (ASIC), digital signal processors (DSPs), digital signal processing devices (DSPDs), programmable logic devices (PLDs), field programmable gate arrays (FPGAs), controllers, microcontrollers, microprocessors or other electronics components, which is configured to perform the above method.

In an example embodiment, a non-transitory computer readable storage medium is further provided which includes instructions, such as the memory 604 including instructions, wherein the instructions may be executed by the processor 620 of the device 600 to complete the above methods. For example, the non-transitory computer readable storage medium may be a ROM, a random access memory (RAM), a CD-ROM, a magnetic tape, a floppy disk, an optical data storage device, etc.

Figure 7:
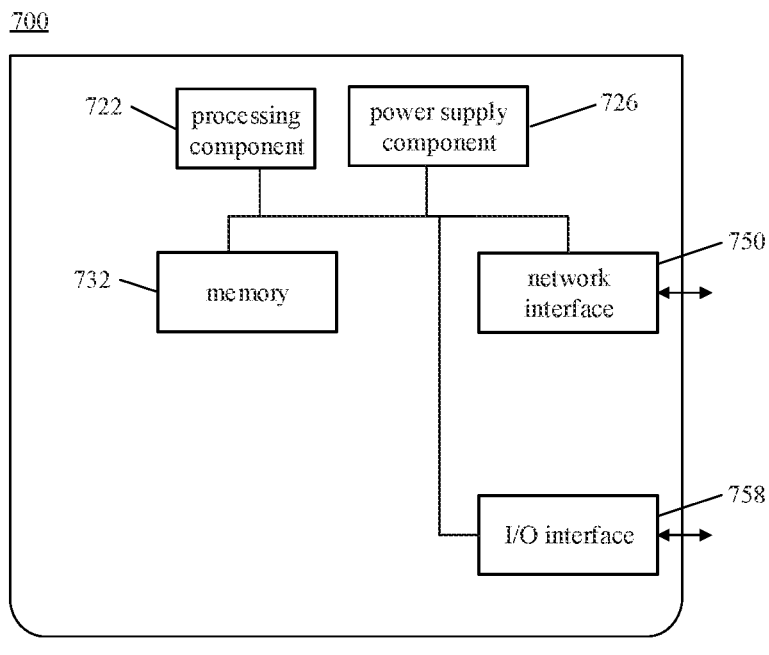
FIG. 7 is a block diagram illustrating a device for processing a random access parameter according to an example embodiment.

FIG. 7 is a block diagram illustrating a device 700 for determining a beam according to an example embodiment. The device 700 may be a network device. As illustrated in FIG. 7, the device 700 includes a processing component 722, which further includes one or more processors, and memory resources represented by a memory 732, which are configured to store instructions executed by the processing component 722, for example, an application. The application stored in the memory 732 may include one or more modules each of which corresponds to a set of instructions. In addition, the processing component 722 is configured to execute instructions, to perform the above method.

The device 700 may further include a power supply component 726, configured to execute power management of the device 700, and a wired or wireless network interface 750, configured to connect the device 700 to a network; and an input/output (I/O) interface 758. The device 700 may operate an operating system stored in the memory 732, for example, Windows Server™, Mac OS X™, Unix™, Linux™, FreeBSD™, etc.

In an example embodiment, a non-transitory computer readable storage medium including instructions is further provided, for example, the memory 732 including instructions. The instructions may be executed by the processing component 722 of the device 700 to complete the above methods. For example, the non-transitory computer readable storage medium may be a ROM, a random access memory (RAM), a CD-ROM, a magnetic tape, a floppy disk, an optical data storage device, etc.

It may be understood that, "a plurality of" in the present disclosure means two or above, which is similar to other quantifiers. "and/or", describes the relationship of the association objects, indicating that there may exist three relationships, for example, A and/or B, may represent: any of existing A only, existing both A and B, or existing B only. The character "/" generally means the contextual object is a kind of "or" relationship. The singular forms "a", "the" and "said are also intended to include plural forms, unless the context clearly indicates otherwise.

It should be further understood that, although the terms "first", "second", "third", etc. may be configured to describe various information, such information shall not be limited to these terms. These terms are only used to distinguish the same type of information, rather than indicate a particular order or importance degree. In fact, "first", "second" and other similar descriptions may be used interchangeably. For example, subject to the scope of this present disclosure, first information may also be referred to as second information, and similarly, and the second information may also be referred to as the first information.

It may be further understood that, even though operations are described in the drawings in a particular order, it should not be understood as requiring that such operations be performed in the particular order shown or in sequential order, or that all illustrated operations be performed to obtain desirable results. In a certain situation, multitasking and parallel processing may be advantageous.

After considering the specification and practicing the disclosure here, those skilled in the art will easily think of other implementations. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary only, and the true scope of the present disclosure are given by the appended claims.

It should be understood that the present disclosure is not limited to the precise structure described above and shown in the drawings, and various modifications and changes may be made without departing from its scope. The scope of the present application is only limited by the appended claims. The scope of the present application is only limited by the appended claims.

What is claimed is:

1. A method for processing a random access parameter, performed by a first type user equipment (UE), the method comprising:

determining a first parameter for random access of the first type UE, wherein the first parameter for random access of the first type UE is not completely the same as or completely different from a second parameter for random access of a second type UE, and a type of the first type UE is different from a type of the second type UE;

sending the first parameter to a network device; and receiving, from the network device, a physical downlink control channel (PDCCH) corresponding to a random access response (RAR), wherein the PDCCH corresponding to the RAR is identified based on the first parameter.

2. The method of claim 1, wherein a UE capability of the first type UE is lower than a UE capability of the second type UE; and the first parameter for random access of the first type UE is configured to enable the network device to determine an initial uplink (UL) bandwidth part (BWP) corresponding to the first type UE, wherein the initial UL BWP corresponding to the first type UE is different from an initial UL BWP corresponding to the second type UE.

3. The method of claim 1, wherein determining the first parameter for random access of the first type UE comprises:

determining the first parameter for random access of the first type UE based on at least one of: a parameter related to the second type UE, or a parameter related to the first type UE.

4. The method of claim 3, wherein the parameter related to the second type UE comprises any one of:

a frequency division multiplexing (FDM) parameter corresponding to the second type UE; or a supplementary uplink (SUL) parameter corresponding to the second type UE; and wherein the parameter related to the first type UE comprises any one of:

a supplementary uplink (SUL) parameter corresponding to the first type UE;

an offset parameter corresponding to the first type UE; or a preset parameter corresponding to the first type UE.

5. The method of claim 4, further comprising at least one of:

determining the FDM parameter corresponding to the second type UE based on remaining minimum system information (RMSI) of the second type UE;

determining the FDM parameter corresponding to the second type UE based on a communication protocol;

determining the FDM parameter corresponding to the second type UE based on a received signaling, wherein the signaling at least comprises one of a field domain or an identifier for indicating the FDM parameter corresponding to the second type UE; or determining the FDM parameter corresponding to the second type UE based on a pre-configuration parameter.

6. The method of claim 4, further comprising at least one of:

determining the preset parameter based on a communication protocol;

determining the preset parameter based on a pre-configuration parameter; or determining the preset parameter based on a received signaling, wherein the signaling at least comprises one of a field domain or an identifier for indicating the preset parameter.

7. The method of claim 4, further comprising at least one of:

determining the offset parameter based on a communication protocol;

determining a candidate offset parameter set based on the communication protocol; and determining at least one candidate offset parameter from the candidate offset parameter set based on a received signaling as the offset parameter, wherein the signaling at least comprises one of a field domain or an identifier for indicating the offset parameter; or determining the offset parameter based on the received signaling, wherein the signaling at least comprises one of a field domain or an identifier for indicating the preset parameter.

8. The method of claim 1, wherein determining the first parameter for random access of the first type UE comprises one of:

determining the first parameter for random access of the first type UE based on a frequency division multiplexing (FDM) parameter corresponding to the second type UE;

determining the first parameter for random access of the first type UE based on an FDM parameter corresponding to the second type UE and a supplementary uplink (SUL) parameter corresponding to the first type UE;

determining the first parameter for random access of the first type UE based on an FDM parameter corresponding to the second type UE and a SUL parameter corresponding to the second type UE;

determining the first parameter for random access of the first type UE based on an FDM parameter corresponding to the second type UE, a SUL parameter corresponding to the second type UE and a SUL parameter corresponding to the first type UE;

determining an offset parameter, and determining the first parameter for random access of the first type UE based on the offset parameter;

determining an offset parameter, and determining the first parameter for random access of the first type UE based on the offset parameter and a preset parameter; or determining an offset parameter, and determining the first parameter for random access of the first type UE based on the offset parameter and an FDM parameter corresponding to the second type UE.

9. The method of claim 8, further comprising at least one of:

determining the FDM parameter corresponding to the second type UE based on remaining minimum system information (RMSI) of the second type UE;

determining the FDM parameter corresponding to the second type UE based on a communication protocol;

determining the FDM parameter corresponding to the second type UE based on a pre-configuration parameter; or determining the FDM parameter corresponding to the second type UE based on a received signaling, wherein the signaling at least comprises one of a field domain or an identifier for indicating the FDM parameter corresponding to the second type UE.

10. A method for processing a random access parameter, performed by a network device, the method comprising:

receiving a first parameter sent by a first type user equipment (UE), wherein the first parameter is configured for random access of the first type UE, the first parameter for random access of the first type UE is not completely the same as or completely different from a second parameter for random access of a second type UE, and a type of the first type UE is different from a type of the second type UE; and sending, to the first type UE, a physical downlink control channel (PDCCH) corresponding to a random access response (RAR), wherein the PDCCH corresponding to the RAR is identified based on the first parameter.

11. The method of claim 10, wherein a UE capability of the first type UE is lower than a UE capability of the second type UE; and the first parameter for random access of the first type UE is configured to enable the network device to determine an initial uplink (UL) bandwidth part (BWP) corresponding to the first type UE, wherein the initial UL BWP corresponding to the first type UE is different from an initial UL BWP corresponding to the second type UE.

12. The method of claim 10, wherein the first parameter for random access of the first type UE is determined based on at least one of:

a parameter related to the second type UE, or a parameter related to the first type UE.

13. The method of claim 12, wherein the parameter related to the second type UE comprises any one of:

a frequency division multiplexing (FDM) parameter corresponding to the second type UE; or a supplementary uplink (SUL) parameter corresponding to the second type UE; and wherein the parameter related to the first type UE comprises any one of:

a supplementary uplink (SUL) parameter corresponding to the first type UE;

an offset parameter corresponding to the first type UE; or a preset parameter corresponding to the first type UE.

14. The method of claim 13, wherein the FDM parameter corresponding to the second type UE is determined based on at least one of:

remaining minimum system information (RMSI) of the second type UE;

a communication protocol; or a received signaling, wherein the signaling at least comprises one of a field domain or an identifier for indicating the FDM parameter corresponding to the second type UE.

15. The method of claim 13, wherein the preset parameter is determined based on at least one of:

a communication protocol;

a pre-configuration parameter; or a received signaling, wherein the signaling at least comprises one of a field domain or an identifier for indicating the preset parameter.

16. The method of claim 13, wherein the offset parameter is determined based on at least one of:

a communication protocol;

at least one candidate offset parameter from a candidate offset parameter set based on a received signaling as the offset parameter, wherein the candidate offset parameter set is determined based on the communication protocol, and the signaling at least comprises one of a field domain or an identifier for indicating the offset parameter; or the received signaling, wherein the signaling at least comprises one of a field domain or an identifier for indicating the preset parameter.

17. The method of claim 10, wherein determining the first parameter for random access of the first type UE comprises one of:

determining the first parameter for random access of the first type UE based on a frequency division multiplexing (FDM) parameter corresponding to the second type UE;

determining the first parameter for random access of the first type UE based on an FDM parameter corresponding to the second type UE and a supplementary uplink (SUL) parameter corresponding to the first type UE;

determining the first parameter for random access of the first type UE based on an FDM parameter corresponding to the second type UE and a SUL parameter corresponding to the second type UE;

determining the first parameter for random access of the first type UE based on an FDM parameter corresponding to the second type UE, a SUL parameter corresponding to the second type UE and a SUL parameter corresponding to the first type UE;

determining an offset parameter, and determining the first parameter for random access of the first type UE based on the offset parameter;

determining an offset parameter, and determining the first parameter for random access of the first type UE based on the offset parameter and a preset parameter; or determining an offset parameter, and determining the first parameter for random access of the first type UE based on the offset parameter and an FDM parameter corresponding to the second type UE.

18. A first type user equipment (UE), comprising:

a processor; and a memory configured to store instructions executable by the processor;

wherein the processor is configured to:

determine a first parameter for random access of the first type UE, wherein the first parameter for random access of the first type UE is not completely the same as or completely different from a second parameter for random access of a second type UE, and a type of the first type UE is different from a type of the second type UE;

send the first parameter to a network device; and receive, from the network device, a physical downlink control channel (PDCCH) corresponding to a random access response (RAR), wherein the PDCCH corresponding to the RAR is identified based on the first parameter.

* * * * *